March 21, 1933.                J. E. TSAVARIS                1,902,737
                             VEHICLE SIGNAL SWITCH
                    Filed Oct. 9, 1930        2 Sheets-Sheet 1
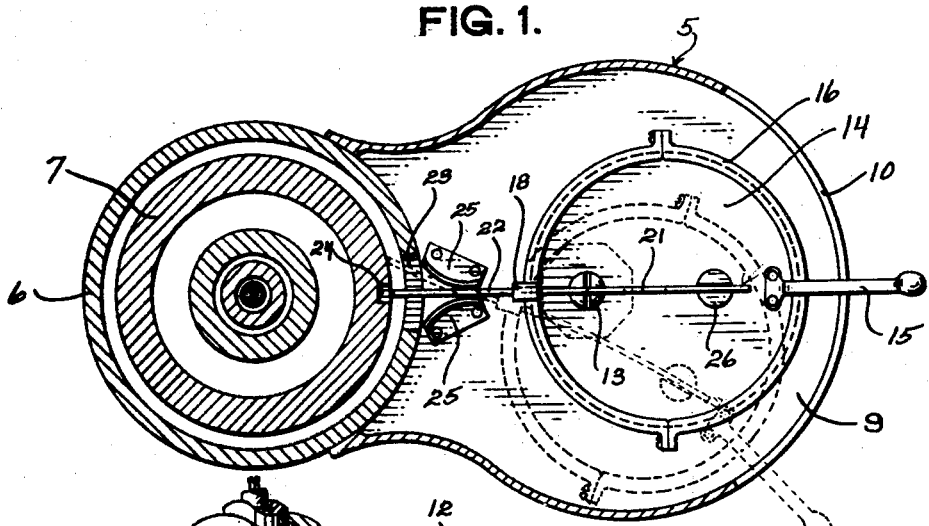
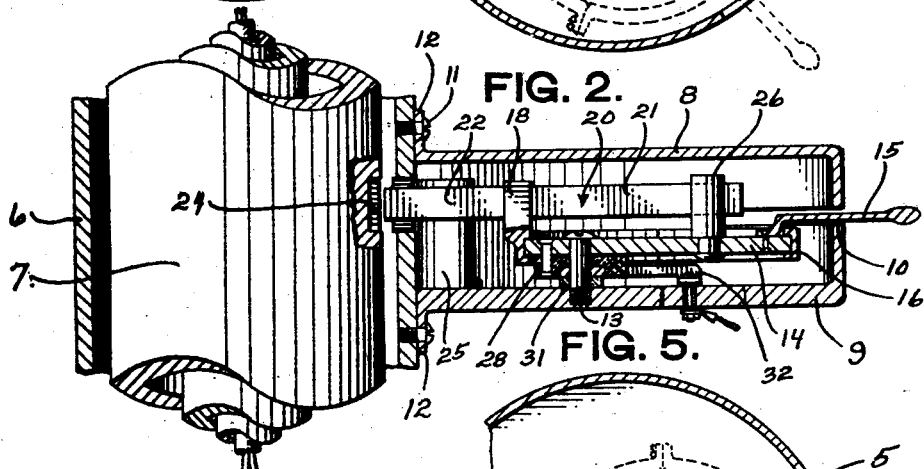
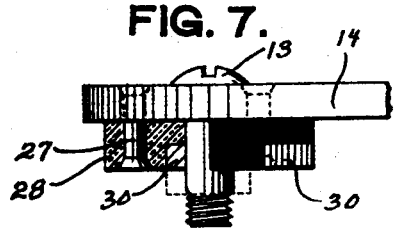
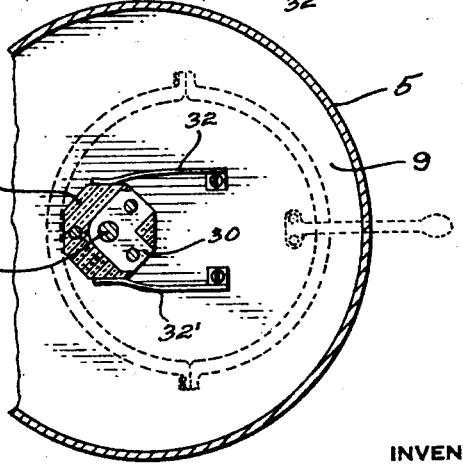
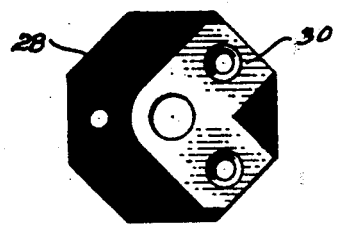
INVENTOR.
John E. Tsavaris
BY *Lancaster, Allwine & Rommel*
ATTORNEYS.

March 21, 1933.  J. E. TSAVARIS  1,902,737
VEHICLE SIGNAL SWITCH
Filed Oct. 9, 1930  2 Sheets-Sheet 2

INVENTOR.
John E. Tsavaris

BY Lancaster, Allwine & Rommel
ATTORNEYS.

Patented Mar. 21, 1933

1,902,737

UNITED STATES PATENT OFFICE

JOHN EMMANUEL TSAVARIS, OF TARPON SPRINGS, FLORIDA

VEHICLE SIGNAL SWITCH

Application filed October 9, 1930. Serial No. 487,540.

The present invention relates to vehicle signals and more particularly to a switch for controlling vehicle direction signals.

The primary object of the invention is to provide a vehicle signal switch for selectively controlling vehicle direction signals prior to actual turning movement of the vehicle.

A further object of the invention is to provide a semi-automatic vehicle signal switch adapted to be manually operated for completing a circuit thru a desired direction signal and automatically operated for breaking the circuit upon return movement of the steering mechanism to a straight forward position.

A further object of the invention is to provide a vehicle signal switch adapted to be associated with the steering column of a vehicle within convenient reach of the driver and which switch may be readily associated with the steering column without any material amount of alteration thereto.

A still further object is to provide a device of this character which is simple in operation and capable of attachment to a steering shaft casing so as to be automatically actuated to an off position by the steering shaft or tube when rotated for returning the steering wheels to a straight ahead position.

Other objects and advantages of the invention will be apparent during the course of the following detailed description, taken in connection with the accompanying drawings forming a part of this specification and in which drawings:

Figure 1 is a horizontal section thru the switch shown applied to a steering column and in an off position.

Figure 2 is a longitudinal section thru the same.

Figure 5 is a fragmentary sectional view showing the contact blocks and contact fingers for completing the circuit.

Figure 7 is an enlarged fragmentary detail view part in section and part in elevation showing the manner in which the contact block is secured to the under side of the eccentric disc.

Figure 8 is a top plan view of the contact block.

Figure 3:
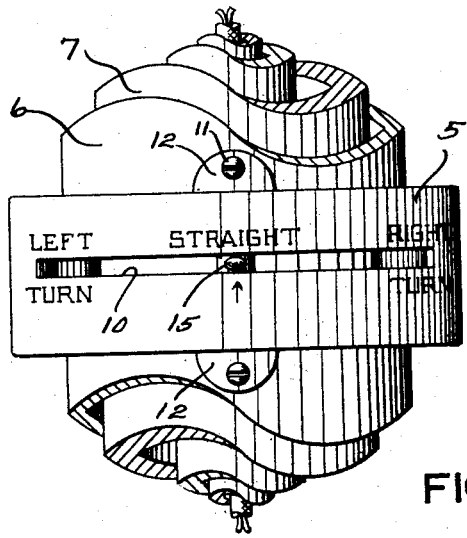
Figure 3 is a front end view of the switch shown applied to the steering column.

In the drawings, and wherein similar reference characters designate corresponding parts thruout the several views, the improved signal switch comprises a substantially flat casing 5 for attachment to the steering shaft casing or housing 6 of a conventional type of steering column in which is rotatably mounted the usual steering shaft or tube 7. The casing 5 is preferably formed with flat top and bottom walls 8 and 9 respectively and has its outer rounded end provided with an arcuate slot 10. The inner open end of the casing is concaved with a curvature corresponding to the circumference of the steering shaft housing 6 and is preferably attached thereto by means of mounting screws 11 passed thru apertured ears 12 projecting from the casing walls 8 and 9.

Pivotally mounted within the casing 5 as upon a cap screw 13 threaded into the lower casing wall 9 along the longitudinal center thereof is an eccentric disc 14 having secured to its upper side in diametric alignment with the pivot 13, one end of an operating lever 15 which projects thru the arcuate casing slot 10, to be manually grasped by the operator. Surrounding the eccentric disc 14 is a band or strap 16 in which the disc has free rotating movement. Projecting upwardly from the band at the inner side of the eccentric disc is an arm 18 thru which is extended a flexible strip 20. This strip 20 is preferably of spring metal and is secured in the arm 18 so as to extend diametrically of the band 16 with its outer end portion 21 projecting beyond the axial center of the band and its inner end portion 22 projecting a suitable distance beyond the concaved inner ends of the casing walls 8 and 9.

The steering shaft housing 6 is provided with a circumferentially formed slot 23 thru which the inner end of the spring strip 20 projects with its inner end spaced a slight distance from the circumference of the steering shaft 7 when the switch is in an open circuit position as shown in Figures 1 and 2. The steering shaft 7 is provided in its circumference with a recess 24 and this recess is arranged at a location so as to align with the central portion of the circumferential slot 23 when the steering shaft is in a position holding the steering wheels in a straight forward line of travel.

Secured to the lower casing wall 9 inwardly of the eccentric disc 14 is a pair of upstanding guide blocks 25 between which the inner end portion 22 of the spring strip 20 has a free sliding movement. These guide blocks 25 are arcuate shaped and arranged with their convex surfaces in confronting relation and preferably diverging toward the steering column, so as to permit flexing of the strip portion 22 as shown by dotted lines in Figure 1 and full lines in Figure 4.

Pivotally mounted in the eccentric disc 14 in diametric alignment with the pivot point of the disc is an upstanding guide pin 26 which is longitudinally slotted from its upper end for slidably receiving the outer end of the spring strip 20.

Secured as by rivets or the like 27 to the under side of the eccentric disc 14 axially of the pivot screw 13 is an octagonal-shaped contact block 28. This contact block 28 is formed of a suitable insulating material and has embedded in its lower side a right angular-shaped contact member 30 having the ends of its arms opening at two faces of the contact block arranged 90° apart. The pivot screw 13 extends thru the elbow of the metallic contact member 30 so that an electrical contact is formed between the pivot screw and contact member. A spacer of insulating material 31 spaces the contact block slightly above the bottom casing wall 9 to permit ready and easy swinging movement of the eccentric disc 14. Insulatively secured to the bottom casing wall 9, forwardly of the pivot screw 13 is a pair of spring contact arms 32 and 32' which are arranged in substantially parallel relation and have their inner free ends yieldably bearing against opposite side edges of the contact block 28. These spring contact arms 32 and 32' are fully insulated from any metallic portion of the switch casing 5 and are intended to have their free ends selectively engageable with the arms of the contact member 30 upon swinging movement of the eccentric disc 14.

Figure 9:
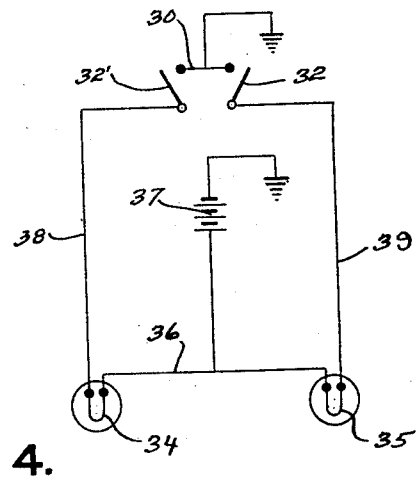
Figure 9 is a wiring diagram showing the switch in circuit for controlling a pair of signal lights.

Referring to Figure 9, 34, and 35 may respectively designate left and right direction signals having a common feed connection 36 for connection to the battery 37 which may be grounded to the vehicle. The left direction signal 34 may be connected by a lead 38 to the spring contact arm 32 while one lead 39 from the right direction signal may connect with the spring contact arm 32'. The contact member 30 is in metallic contact with the switch casing 5 and thus grounded upon the vehicle thru the steering column.

The rounded outer end of the switch casing is preferably marked as shown in Figure 3 with the marking "Left turn" arranged at the left hand end of the slot 10 and the marking "Right turn" at the right hand end of the slot.

In operation, when the switch is in a neutral position as shown in Figures 1 and 2, the inner end of the spring strip 20 is slightly out of contact with the steering shaft 7 permitting rotation of the shaft in either direction without contacting with the spring strip. With the switch in its neutral position the operating lever 15 is in alignment with the spring strip 20 at the center of the slot 10 and the octagonal shaped contact block 28 is in a position as shown in Figure 5 with the spring contact arms bearing against diametrically opposite sides of the block and out of contact with the contact member 30. Assuming that a left turn is to be made by the vehicle, the driver, prior to any actual left turning of the vehicle, moves the control arm to the left in the slot 10 and causing the eccentric disc 14 to assume the position shown by dotted lines in Figure 1 and full lines in Figure 4. This movement of the arm 15 swings the eccentric disc thru one-eighth of a turn about its pivot 13. This swinging of the eccentric disc causes the arm 18 fixedly carried by the band 16 to be moved toward the guide blocks 25 and causes the inner end of the spring strip 20 to engage the circumference of the steering shaft at that side of the recess 24 toward which the steering shaft is rotated for executing a left turn. This movement causes a slight flexing of the inner strip portion 22 and causes the end of the strip to frictionally bear upon the circumference of the steering shaft. This swinging of the eccentric disc also imparts a one-eighth turn of the contact block 28 and allows one arm of the contact member 30 to engage the spring contact arm 32' and completes a circuit thru the left direction signal 34. The spring contacts 32 and 32' thru engagement with diametrically opposite flat sides of the octagonal shaped contact block 28 assist in preventing counter movement of the eccentric disc to a neutral position and this counter movement is also aided by the flat strip portion 22. The operator may then, at the location where it is desired to make the left turn, rotate the steering wheel in the proper direction which rotates the steering shaft in the direction of the arrow shown in Figure 4 whereby the recess 24 will ride past the end of the spring strip without imparting any movement to the eccentric disc. Thus it will be seen that a circuit is completed to the desired signal prior to actual turning movement of the vehicle.

Figure 4:
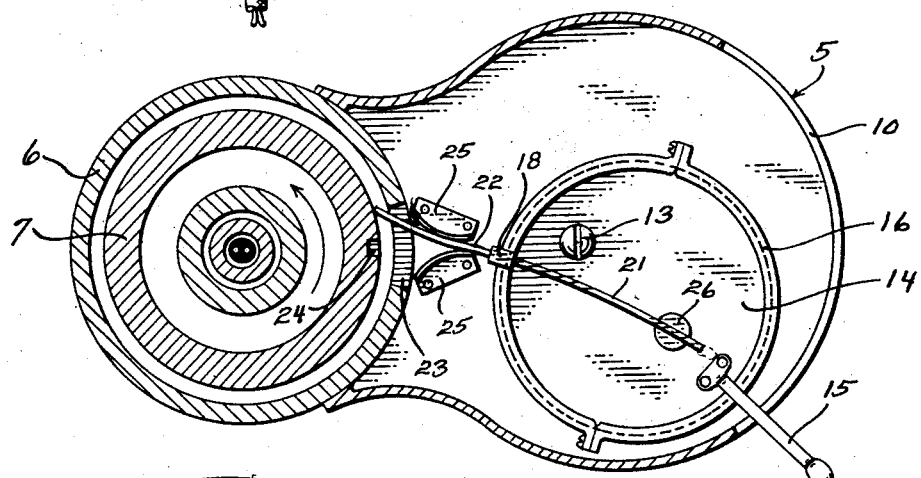
Figure 4 is a horizontal section showing the switch in a circuit closing position.
Figure 6:
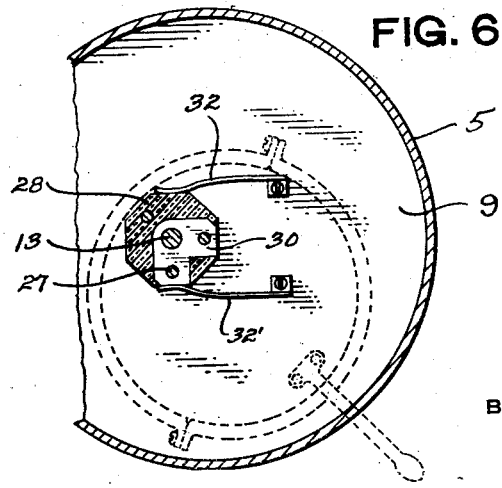
Figure 6 is a view similar to Figure 5 but showing the position of the contact blocks when forming electrical contact with one of the spring fingers.

As the steering shaft is rotated in the opposite direction from the arrow in Figure 4 for returning the vehicle to a straight path of travel, the end of the spring strip engages in the recess 24 causing the contact block 25 to act as a fulcrum between the ends of the strip portion 22 and cause the eccentric band arm 18 and pin 26 to return to their normal positions in alignment with the pivot 13. This return movement of the eccentric disc withdraws the spring strip from the recess 24 and disengages the contact arm 32' from the contact member 30 and opens the circuit to the left direction signal.

When the right hand turn is to be made the control arm 15 is moved to the right hand end of the slot 10 causing the inner end of the spring strip to engage the steering shaft at the opposite side of the slot from that shown in Figure 4 and causing the contact member 30 to engage with the spring contact arm 32. The octagonal shaped contact block 28 thru engagement by the spring contact arms 32 and 32' will yieldably retain the switch in a neutral position or in a right or in a left turn position.

Thus it will be seen that a novel type of vehicle signal switch has been provided which may be manually operated for indicating a desired turn and automatically operated by the steering mechanism of the vehicle for breaking the circuit to the selected signal after the turn has been completed. It will also be apparent that a novel device has been shown which may be readily applied to existing types of steering columns and at a location to be conveniently operated by the driver.

Changes in detail may be made to the form of invention herein shown and described, without departing from the spirit of the invention or the scope of the following claims.

I claim:

1. In a vehicle signal switch the combination with a steering column housing having an opening therethru and a steering tube rotatable in the housing and provided with a recess for movement past said opening, of a casing mounted upon the housing over said opening, a manually operated eccentric disc mounted in the casing, circuit controlling means operable by movement of the disc when swung to either side of a neutral position, an eccentric strap on the disc, and a spring arm carried by the strap and operatively connected to the eccentric disc for movement into engagement at one end with the periphery of the steering tube at a selected side of said recess, said end of the arm being engaged in the recess upon rotation of the steering shaft to return the disc to a neutral position.

2. In a vehicle signal switch the combination with a steering column housing having an opening therethru and a steering tube rotatable in the housing and provided with a recess for movement past said opening, of a casing mounted upon the housing over said opening, a disc eccentrically mounted in the casing, an arm carried by the disc and projecting exteriorly of the casing for manually moving the disc, a pair of contact arms, a contact member carried by the disc for selectively engaging the contact arms, a band rotatable about the disc, a spring arm carried by and projecting radially from the band for engagement at its inner end with the periphery of the steering tube at one side of said recess opposite to the direction of movement of the disc and means slidably connecting the outer end of the spring arm to the disc.

3. A vehicle signal switch for attachment to a steering column housing in operative relation to a steering shaft rotatable in the housing, comprising a casing being opened at its inner end, a disc eccentrically mounted in the casing, a control arm carried by the disc and projecting thru the forward end of the casing, a slotted guide member pivoted on the disc, a band encircling the periphery of the disc and having an upstanding arm, a spring strip carried by the arm having its inner end projecting beyond the open side of the casing and its outer end slidable in the slot of said guide member, a pair of guide blocks engaging at opposite sides of the spring strip, a polygonal-shaped contact block carried by the disc co-axial with the pivotal axis of the disc, a contact member carried by the contact block and having arms opening at two faces of the block, and a pair of spring contact arms for engagement by the contact member upon movement of the disc to a circuit closing position.

4. A vehicle signal switch of the class described comprising a casing having an open inner end, a disc eccentrically mounted in the casing, a control arm on the disc and projecting thru the forward end of the casing, an eccentric strap encircling the disc, an arm upstanding from the strap, a flexible strip carried by the arm having an inner end portion projecting radially of the strap and extending beyond the open inner end of the casing and an outer end portion having a slidable connection with the disc at a point diametrically aligning with the axis of the disc, a pair of guide arms for the inner end portion of the strip, a polygonal shaped contact block of insulating material carried by the under side of the disc on the pivotal axis thereof and having its opposed edges in parallel relation, a contact member carried by the block and opening at two angular faces thereof, and a pair of spring contact arms yieldably engaging the block at diametrically opposite sides of its axis, said contact arms to have selective engagement with the contact member when the disc is moved to either side from a neutral position.

5. A vehicle signal switch of the class described comprising a casing having a rounded outer end and an open concaved inner end, said outer end having an arcuate slot, a disc eccentrically mounted in the casing, an eccentric strap encircling the disc and having an upstanding lug, an operating arm on the disc and extending thru the arcuate slot, a spring strip secured in the lug having an inner end portion projecting beyond the open inner end of the casing and an outer end portion extending over the disc, a pin rotatably mounted in the disc and having a slotted upper end receiving the outer end portion of the spring strip, a pair of guide arms for the inner end portion of the strip, and circuit closing means arranged beneath the disc and operable upon movement thereof for selectively controlling signal circuits in accordance with movement of the disc.

JOHN EMMANUEL TSAVARIS.